United States Patent

Wen et al.

[11] Patent Number: 6,077,897
[45] Date of Patent: Jun. 20, 2000

[54] POLYMERIC COMPOSITE ELECTROLYTE AND PROCESS FOR PRODUCING SAME

[76] Inventors: Ten-Chin Wen, No. 1, Ta Hsueh Rd., Tainan, Taiwan; Tsung-Tien Cheng, No. 357, Ta Feng First Rd., San-Ming District, Kaohsiung, The Hong Kong Special Administrative Region of the People's Republic of China

[21] Appl. No.: 08/980,990

[22] Filed: Dec. 1, 1997

[51] Int. Cl.$^7$ ............................... C08J 3/00; C08K 3/20; C08L 75/00; G02F 1/15
[52] U.S. Cl. ............................ 524/366; 524/401; 524/589; 524/590; 524/839; 524/840; 359/265; 359/270; 427/372.2; 427/385.5; 427/58; 429/188; 429/190; 429/191; 429/192; 429/194; 429/197
[58] Field of Search ...................... 524/366, 401, 524/589, 590, 591, 839, 840; 427/372.2, 385.5, 58; 429/188, 190, 191, 192, 194, 197; 359/265, 270

[56] References Cited

U.S. PATENT DOCUMENTS

| | | |
|---|---|---|
| 4,654,279 | 3/1987 | Bauer et al. .............................. 429/192 |
| 5,019,467 | 5/1991 | Fujiwara .................................. 429/127 |
| 5,110,694 | 5/1992 | Nagasubramanian et al. ......... 429/192 |
| 5,912,093 | 6/1999 | Wen et al. ............................... 429/192 |

*Primary Examiner*—Patrick D. Niland
*Attorney, Agent, or Firm*—Madson & Metcalf

[57] ABSTRACT

A process for producing a WPU-PEO based composite electrolyte is disclosed. The process includes steps of a) providing a polyurethane material as a matrix material; b) dispersing the matrix material in a first solvent and mixing PEO in the same solvent to form a dispersion solution; c) drying the dispersion solution to form a thin composite film of WPU-PEO as a matrix of the polymeric electrolyte; and d) adding a component of an anhydrous liquid electrolyte into the matrix to form the WPU-PEO based composite electrolyte. The fabricated thin film electrolyte has a good conductivity (up to $10^{-2} \sim 10^{-3}$ S/cm at room temperature) and can be suitably used in cells, e.g. lithium ion batteries, lithium batteries, and electrochromic devices. The feasibility of the use of a mixture of various WPU, cross-linked WPU, and WPU based composite electrolytes in lithium ion batteries, lithium batteries, and electrochromic devices is also disclosed.

30 Claims, No Drawings

POLYMERIC COMPOSITE ELECTROLYTE AND PROCESS FOR PRODUCING SAME

FIELD OF THE INVENTION

The present invention is related to a polymeric electrolyte, and more particularly, to a composite electrolyte consisting of waterborne polyurethane (WPU), polyethylene oxide (PEO), and liquid electrolytes. Also, the present invention is related to a process for producing a WPU-PEO based composite electrolyte. Further, the present invention is related to the use of a polymeric composite electrolyte such as WPU, cross-linked WPU, mixture of WPU, and/or WPU-PEO based electrolytes in lithium ion batteries, lithium batteries, electrochromic devices, and other fields for ionic conduction.

BACKGROUND OF THE INVENTION

A polymeric solid electrolyte is a kind of polymeric thin film performing ion conduction rather than electron conduction. The polymeric solid electrolyte is adapted to be used in a series of primary and secondary lithium cells or lithium-ion cells to thin the cells in shape. The thinned cells can also be further processed into windable cells, bipolar stack cells, thin-film cells, etc., according to various requirements. In addition, the use of polymeric solid electrolytes in the cells can overcome the problems of difficult package and current leakage encountered by general cells with liquid electrolyte.

In earlier stage, the research on polymeric solid electrolytes is focused on the polyethylene oxide-based material. The material has a relatively low conductivity, as low as $10^{-7} \sim 10^{-8}$ S/cm, at room temperature so that the material works only at high temperature such as 80° C. or above. Furthermore, a lot of organic solvent which is detrimental to the industrial security and the environmental protection is used and then evaporated in the process for producing the polyethylene oxide based thin film.

In recent years, gel electrolytes, such as polyacrylonitrile (PAN) based electrolytes, have been reported to be used in cells, and the product has a practically desired level of conductivity at room temperature. Nevertheless, the film has to be produced in a glove box or dry room so that the manufacturing process will be built with high cost.

In addition, B. J. Bauer et. al claimed in U.S. Pat. No. 4,654,279 a two phase interpenetrating network, i.e. a mechanical supporting phase of a continuous network of a crosslinked polymer, and an ionic conducting phase, comprising a metal-salt-complexing liquid polymer. The conductivities of these polymeric electrolytes are constrained by the properties of the liquid polymer, which are approximating $10^{-4}$ S/cm, too low to be used in general lithium batteries.

On the other hand, our another invention bearing a U.S. patent application Ser. No. 08/856,725 and filed on May 15, 1997 claims a polymeric electrolyte of a polymer (WPU) film containing an organic liquid electrolyte. Among these electrolytes, WPU plays the roles of mechanical supporting matrix and ions conducting medium. Due to the conflict of these two properties in general, it is not easy to improve both of the conductivity and the mechanical strength simultaneously.

SUMMARY OF THE INVENTION

Therefore, an objective of the present invention is to provide a process for producing a WPU-PEO based composite electrolyte, which can be carried out in the presence of an extremely small amount of organic solvent so that the problems in industrial security and environmental protection during the process can be solved.

Another objective of the present invention is to provide a process for producing a WPU-PEO composite film, which can be carried out in air substantially, thereby facilitating the mass production of the electrolytes and reducing the manufacturing cost.

A further object of the present invention is to provide a WPU-PEO based composite electrolyte which has the conductivity as high as $10^{-3} \sim 10^{-2}$ S/cm at room temperature and performs good mechanical strength. In this invention, linear and crosslinked WPU are both feasible for being used as a matrix of the polymeric electrolyte. Furthermore, PEO serves as the absorbent of liquid electrolytes.

A further object of the present invention is to provide a WPU-PEO based composite electrolyte which can be used in cells, thereby thinning the cells in shape and allowing the cells to be further processed as desired.

In accordance with the present invention, a process for producing a WPU-PEO based composite electrolyte includes steps of: a) providing a polyurethane material as a matrix material; b) dispersing the matrix material in a first solvent and mixing PEO in the same solvent to form a dispersion solution; c) drying the dispersion solution to form a thin composite film of WPU-PEO as a matrix of the polymeric electrolyte; and d) adding a component of an anhydrous liquid electrolyte into the matrix to form the WPU-PEO based composite electrolyte.

Preferably, the step a) includes substeps of: a1) polymerizing a dried hydroxyl group-containing component and an isocyano group(—NCO)-containing component to form a prepolymer of polyurethane; and a2) adding to the prepolymer a diamino-chain extender in the presence of a second solvent to form the matrix material. In the above steps, the NCO-containing component is a compound including two or more isocyano groups therein or a mixture of compounds including various numbers of isocyano groups therein. For example, the isocyano group-containing component can be one selected from a group consisted of toluene diisocyanate (TDI), methylene diphenylene diisocyanate (MDI), isophorone diisocyanate (IPDI), dicyclohexane methylene diisocyanate, ($H_{12}$MDI), xylene diisocyanate (XDI), hydrogenated xylene diisocyanate ($H_6$XDI), . . . and a mixture thereof. On the other hand, the hydroxyl group (OH)-containing component is a compound including two or more hydroxyl groups therein or a mixture of compounds including various numbers of hydroxyl groups therein. For example, the hydroxyl group-containing component can be one selected from polyester diol or polyether diol, e.g. polyethylene glycol (PEG), polypropylene glycol (PPG), polytetramethylene glycol (PTMG), polyhexylene adipiate, polydutylene adipiate, . . . and a mixture thereof.

Preferably, the polymerization reaction of step a1) is carried out at a temperature ranged from 60 to 100° C., and a functionality ratio of isocyano groups to hydroxyl groups (NCO/OH) lies between 1.0 and 3.0.

In a preferred embodiment, the second solvent used in the step a2) is acetone, and the diamino-group extender used in the step a2) is lithium diaminosulfonate.

Preferably, the first solvent used in the step b) is water or hydrophilic solvent, e.g. ethanol and/or propanol, or a mixture thereof. In this case, an ionic groups such as a carboxyl group and/or a sulfonic group is preferably provided to the prepolymer in the step a1) for enhancing the hydrophilicity of the resulting matrix material. The attachment of the ionic groups to the prepolymer can be made by adding a compound containing the ionic group, e.g. dimethanol propionic acid (DMPA), to the reaction system during the polymerization step, or previously providing the ionic group to the hydroxyl group-containing component and/or the isocyano group-containing component prior to the polymerization step.

Preferably, the step b) of the present process includes substeps of: b1) dropping water to the matrix material formed in step a); and b2) removing the second solvent used in step a2); and b3) resolving PEO in the first solvent and mixing with the dispersion formed in step b2) to form a uniform dispersion solution.

Preferably, the step c) is carried out by blowing the dispersion solution in air or warming the dispersion solution in an oven.

Preferably, the step d) is carried out by immersing the matrix into a anhydrous liquid electrolyte containing a metal salt and a third solvent to swell the matrix, wherein the metal salt is a lithium salt selected from a group consisted of $LiCF_3SO_3$, $LiClO_4$, $LiPF_6$, $LiBF_4$, $LiAsF_6$, $LiN(CF_3SO_2)_3$, . . . and a mixture thereof, and the third solvent is one selected from a group consisted of propylene carbonate (PC), ethylene carbonate (EC), diethyl carbonate (DEC), dimethyl carbonate (DMC), diethyl ether (DEE), γ-butyrolactone (γ-BL), 2-methyl-tetrahydrofuran (2-Me-THF), 1,2-dimethoxyethane (DME), tetrahydrofuran (THF), N-methyl-2-pyrrolidone (NMP), dioxolane, . . . and a mixture thereof.

In accordance with another aspect of the present invention, a WPU-PEO based composite electrolyte includes a thin film of WPU-PEO serving as a matrix of the polymeric electrolyte, where PEO serves as absorbent of liquid electrolyte; and the liquid electrolyte arranged in the matrix for ion conduction, wherein the liquid electrolyte includes a lithium salt selected from a group consisted of $LiCF_3SO_3$, $LiClO_4$, $LiPF_6$, $LiBF_4$, $LiAsF_6$, $LiN(CF_3SO_2)_3$, . . . and a mixture thereof, and a solvent selected from a group consisted of propylene carbonate, ethylene carbonate, diethyl carbonate, dimethyl carbonate, diethyl ether, γ-butyrolactone, 2-methyl-tetrahydrofuran, 1,2-dimethoxyethane, tetrahydrofuran, N-methyl-2-pyrrolidone, dioxolane, . . . and a mixture thereof.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

As disclosed above, the present WPU-PEO composite electrolyte includes a thin film of WPU-PEO and an anhydrous liquid electrolyte. Now, a process for producing this polymeric electrolyte will be described more clearly as follows by using a diidocyanate compound as the isocyano group-containing component, a polydiol as the hydroxyl group-containing component, dimethanol propionic acid as the ion-group donor, lithium diaminosulfonate as the diamino-chain extender, and proper solvents. The process includes steps of:

a) drying the polydiol compound in a vacuum oven;
b) polymerizing the dried polydiol compound and the diisocyanate compound with a functionality ratio of 1.0<NCO/OH<3.0 at a temperature ranged within 60–100° C. in the optional presence of an adequate amount of dimethanol propionic acid to form a WPU prepolymer;
c) adding acetone and lithium diaminosulfonate to the prepolymer to accomplish the polymerization;
d) forming a dispersion solution of the resulting product in step c) by dropping thereto substantially pure water;
e) recovering acetone from the dispersion solution under reduced pressure and heat to form a waterborne WPU aqueous solution, wherein the solid content in the solution can be adjusted according to the desired operational viscosity;
f) mixing the WPU dispersion with PEO in aqueous solution to form an uniform dispersion solution;
g) drying an adequate amount of the dispersion solution formed in step f) by blowing the solution in air or warming it in an oven to form a WPU-PEO thin film; and
h) immersing the WPU-PEO thin film in an anhydrous liquid electrolyte, preferably in a drying box, to swell the film, thereby obtaining the present composite electrolyte including a thin composite film of WPU-PEO and an anhydrous liquid electrolyte.

The diisocyanate compound includes a variety of compounds having two —NCO functional groups in its molecule, for example TDI, MDI, IPDI, $H_{12}MDI$, XDI, $H_6XDI$, etc. On the other hand, the polydiol compound includes a variety of compounds having two —OH functional groups in its molecule, for example PEG, PPG, PTMG, . . . etc. It should be understood that compounds having more than two —NCO functional groups or —OH functional groups can also be used in lieu of the diisocyanate compound and the polydiol compound, respectively. Alternatively, a mixture of compounds having various numbers of isocyano groups or a mixture of compounds having various numbers of hydroxyl groups can be used. The toughness and the water-absorption capacity of the WPU-PEO thin film can be adjusted by varying the components included in the hydroxyl group-containing mixture and the corresponding proportions thereof as well as by varying the weight ration of PEO in the WPU-PEO thin film.

The above-mentioned dimethanol propionic acid used in the polymerization step can enhance the hrdrophilicity of the resulting prepolymer to facilitate the conversion of the prepolymer into waterborne material and further make the water-absorption capacity of the WPU-PEO thin film enhanced. In addition, dimethanol propionic acid can also facilitate the promotion of the conductive performance of the finial electrolyte since the neutralization between dimethanol propionic acid and lithium hydroxide makes the electrolyte bear lithium ions. Of course, the above effects can also be achieved by another way instead of adding the acid to the reaction system during polymerization, for example providing the ionic group to the hydroxyl group-containing component (the polydiol compound) and/or the isocyano group-containing component (the diisocyanate compound) prior to the polymerization step.

The above-mentioned liquid electrolyte can be any kind of lithium salt in an adequate solvent used in conventional lithium cells. For example, they can be $LiCF_3SO_3$, $LiClO_4$, $LiPF_6$, $LiBF_4$, $LiAsF_6$, $LiN(CF_3SO_2)_3$ or a mixture thereof in a solvent of PC, EC, DEC, DMC, DEE, γ-BL, 2-Me-THF, DME, THF, NMP, dioxolane or a mixture thereof.

The process for preparing the WPU-PEO composite film according to the present invention has advantages of being able to be carried out in air, no difficulty in the treatment of organic solvent, and minimizing the requirement for operation in an oven or a glove box. The final product, the composite electrolyte, can be applied to a series of lithium cells at various temperatures, e.g. from 5° C. to 90° C., depending on the formulation of the polymeric matrix. Moreover, the present electrolyte is also suitable for an electrochromic device owing to the excellent transparency thereof. Examples are now given to illustrate the present invention in detail. It should be noted that the examples are only given for illustrative purposes rather than limiting the scope of the present invention.

EXAMPLE 1

88 g of PTMG, 32 g of IPDI and 1.2 g of DMPA are mixed and reacted in a reactor under nitrogen atmosphere with stirring to form a prepolymer. Add acetone and lithium diaminosulfonate to the prepolymer, then drop pure water to the system, and then recover acetone under reduced pressure and heat to form a waterborne WPU dispersion solution.

EXAMPLE 2

Mix the dispersion solution obtained in Example 1 with PEO aqueous solution and dry the resulting solution to form a WPU-PEO composite film.

EXAMPLE 3

Swell the WPU-PEO composite film with an anhydrous solution of 1M $LiCF_3SO_3/PC$ in a glove box to obtain a WPU-PEO based composite electrolyte.

EXAMPLE 4

Swell the WPU-PEO composite film with an anhydrous solution of 1M $LiClO_4/PC$ in a glove box to obtain a WPU-PEO based composite electrolyte.

EXAMPLE 5

Swell the WPU-PEO composite film with an anhydrous solution of 1M $LiPF_6/PC/DEC$ in a glove box to obtain a WPU-PEO based composite electrolyte.

EXAMPLE 6

Assemble the $Li/LiCoO_2$ plastic cell using the WPU-PEO based electrolyte with WPU:PEO:$LiClO_4$/PC=1:1:2 in weight. Charge/discharge this cell with 0.025 $mA/cm^2$ between 4.2V and 3.0V. The theoretical cathode capacity is 4.7 mAh, and the charging capacity is 4.69 mAh. The columbic efficiency (discharge/charge) is ca. 100%.

Compared to the conventional organic electrolytic solution, the present composite electrolyte is suitable for manufacturing a thin film cell, a bipolar stack cell or a secondary lithium cell. Compared to the solid electrolyte having no solvent therein, such as polyethylene oxide (PEO) or poly(methoxyethoxy ethoxyphosphazene) (MEEP)-based electrolyte, the present composite electrolyte has high conductivity ($10^{-2}$~$10^{-3}$ S/cm at room temperature) and proper mechanical toughness. In addition, during the WPU-PEO dispersion solution is dried to form the WPU-PEO composite film, no industrial security and environmental protection problems resulting from the evaporation of organic solvent are caused because water is the major solvent in the dispersion solution. Further, the present electrolyte performs well at various temperature. Compared to the conventional gel electrolyte such as polyacrylonitrile (PAN) based electrolyte, the present process is easy and suitable for mass production.

To sum up, the present composite electrolyte is obtained by arranging an anhydrous liquid electrolyte in a WPU-PEO composite film. The present electrolyte can be applied to a series of lithium cells and electrochromic devices for providing high conductivity at room temperature. On the other hand, the present process for producing a waterborne WPU-PEO based composite electrolyte complies with the requirements for mass production, industrial security and environmental protection.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A process for producing a waterborne polyurethane and polyethylene oxide (WPU-PEO) based composite electrolyte, comprising steps of:
    a) providing a polyurethane material as a matrix material;
    b) dispersing said matrix material in a first solvent to form a matrix solution;
    c) mixing said matrix solution with a PEO aqueous solution to form a mixture solution;
    d) drying said mixture solution to form a thin film of WPU-PEO as a matrix of said polymeric electrolyte; and
    e) adding a component of an anhydrous liquid electrolyte into said matrix of said polymeric electrolyte to form said WPU-PEO composite electrolyte.

2. The process according to claim 1 wherein said step a) includes substeps of:
    a1) polymerizing a dried hydroxyl group-containing component and an isocyano group-containing component to form a prepolymer of polyurethane; and
    a2) adding to said prepolymer a diamino-chain extender in the presence of a second solvent to form said matrix material.

3. The process according to claim 2 wherein said isocyano group-containing component is a compound including two or more isocyano groups therein.

4. The process according to claim 2 wherein said isocyano group-containing component is a mixture of compounds including various numbers of isocyano groups therein.

5. The process according to claim 2 wherein said isocyano group-containing component is one selected from a group consisted of toluene diisocyanate, methylene diphenylene diisocyanate, isophorone diisocyanate, dicyclohexane methylene diisocyanate, xylene diisocyanate, hydrogenerated xylene diisocyanate, and a mixture thereof.

6. The process according to claim 2 wherein said hydroxyl group-containing component is a component including two or more hydroxyl groups.

7. The process according to claim 2 wherein said hydroxyl group-containing component is a mixture of compounds including various numbers of hydroxyl groups therein.

8. The process according to claim 2 wherein said hydroxyl group-containing component is one selected from a group consisted of polyethylene glycol, polypropylene glycol, polytetramethylene glycol, and a mixture thereof.

9. The process according to claim 2 wherein said step a1) is carried out at a temperature ranged from 60 to 100° C.

10. The process according to claim 2 wherein a functionality ratio of isocyano groups to hydroxyl groups lies between 1.0 and 3.0.

11. The process according to claim 2 wherein said second solvent used in said step a2) is acetone.

12. The process according to claim 2 wherein said diamino-group extender used in said step a2) is lithium diaminosulfonate.

13. The process according to claim 2 wherein said first solvent used in said step b) is water.

14. The process according to claim 13 wherein an ionic group is provided to said prepolymer in said step a1) for enhancing the hydrophilicity of the resulting matrix material.

15. The process according to claim 14 wherein said ionic group is a carboxyl group.

16. The process according to claim 14 wherein said ionic group is a sulfonic group.

17. The process according to claim 14 wherein in step a1), a compound containing said ionic group is added to the reaction system during said polymerization step to provide said ionic group to said prepolymer.

18. The process according to claim 17 wherein said compound containing said ionic group is dimethanol propionic acid.

19. The process according to claim 14 wherein in step a1), said ionic group is provided to said hydroxyl group-containing component and/or said isocyano group-containing component prior to said polymerization step so as to form said prepolymer carrying said ionic group after polymerization.

20. The process according to claim 13 wherein said step b) includes substeps of b1) dropping water to said matrix material formed in step a); and b2) removing said second solvent used in step a2).

21. The process according to claim 13 wherein said step d) is carried out by blowing said mixture solution in air.

22. The process according to claim 13 wherein said step d) is carried out by warming said mixture solution in an oven.

23. The process according to claim 1 wherein said step e) is carried out by immersing said matrix into an anhydrous liquid electrolyte containing a metal salt and a third solvent to swell said matrix.

24. The process according to claim 23 wherein said metal salt is a lithium salt selected from a group consisted of $LiCF_3SO_3$, $LiClO_4$, $LiPF_6$, $LiBF_4$, $LiAsF_6$, $LiN(CF_3SO_2)_3$, and a mixture thereof.

25. The process according to claim 24 wherein said third solvent is one selected from a group consisted of propylene carbonate, ethylene carbonate, diethyl carbonate, dimethyl carbonate, diethyl ether, $\gamma$-butyrolactone, 2-methyl-tetrahydrofuran, 1,2-dimethoxyethane, tetrahydrofuran, N-methyl-2-pyrrolidone, dioxolane, and a mixture thereof.

26. A WPU-PEO based composite electrolyte, comprising:

a thin composite film of WPU-PEO serving as a matrix of said composite electrolyte and an anhydrous liquid electrolyte arranged in said matrix for ion conduction, wherein said composite electrolyte is obtained by providing a polyurethane material as a matrix material, dispersing said matrix material in a first solvent to form a matrix solution, mixing said matrix solution with a PEO aqueous solution to form a mixture solution, drying said mixture solution to form said thin composite film of WPU-PEO as a matrix of said polymeric electrolyte, and adding said anhydrous liquid electrolyte into said matrix of said polymeric electrolyte to form said WPU-PEO composite electrolyte.

27. The WPU-PEO based composite electrolyte according to claim 26 wherein said liquid electrolyte includes a lithium salt selected from a group consisted of $LiCF_3SO_3$, $LiClO_4$, $LiPF_6$, $LiBF_4$, $LiAsF_6$, $LiN(CF_3SO_2)_3$, and a mixture thereof.

28. The WPU-PEO based composite electrolyte according to claim 26 wherein said liquid electrolyte includes a solvent selected from a group consisted of propylene carbonate, ethylene carbonate, diethyl carbonate, dimethyl carbonate, diethyl ether, $\gamma$-butyrolactone, 2-methyl-tetrahydrofuran, 1,2-dimethoxyethane, tetrahydrofuran, N-methyl-2-pyrrolidone, dioxolane, and a mixture thereof.

29. A WPU-PEO based electrolyte according to claim 26 incorporated in a lithium ion battery or a lithium battery.

30. A WPU-PEO based electrolyte according to claim 26 incorporated in an electrochromic device.

* * * * *